(12) United States Patent
Watanabe et al.

(10) Patent No.: US 8,834,333 B2
(45) Date of Patent: Sep. 16, 2014

(54) CHARGING MEMBER, ELECTROPHOTOGRAPHIC APPARATUS AND PROCESS CARTRIDGE

(75) Inventors: Hiroaki Watanabe, Odawara (JP); Masaaki Harada, Mishima (JP); Keiji Nose, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/044,022

(22) Filed: Mar. 9, 2011

(65) Prior Publication Data

US 2011/0200356 A1 Aug. 18, 2011

Related U.S. Application Data

(63) Continuation of application No. PCT/JP2010/006720, filed on Nov. 16, 2010.

(30) Foreign Application Priority Data

Dec. 22, 2009 (JP) ................................. 2009-290917

(51) Int. Cl.
| | |
|---|---|
| *F16C 13/00* | (2006.01) |
| *C08C 19/44* | (2006.01) |
| *G03G 15/02* | (2006.01) |
| *C08K 3/04* | (2006.01) |
| *C08L 9/00* | (2006.01) |

(52) U.S. Cl.
CPC ............ *C08C 19/44* (2013.01); *C08K 2201/001* (2013.01); *G03G 15/0233* (2013.01); *C08K 3/04* (2013.01)
USPC ............................................... 492/56; 492/53

(58) Field of Classification Search
USPC .......... 492/48, 53, 56, 59; 525/102, 105, 342; 526/178, 180, 335, 340; 524/443, 572
See application file for complete search history.

(56) References Cited

U.S. PATENT DOCUMENTS 2,790,839 A * 4/1957 Doak .......................... 524/575.5
4,621,121 A * 11/1986 Schwarze et al. ........... 525/329.3
(Continued)

FOREIGN PATENT DOCUMENTS

| CN | 1578790 A | 2/2005 |
|---|---|---|
| CN | 1743970 A | 3/2006 |

(Continued)

OTHER PUBLICATIONS

English machine translation of JP 2009-033100.*
(Continued)

*Primary Examiner* — Essama Omgba
(74) *Attorney, Agent, or Firm* — Fitzpatrick, Cella, Harper & Scinto

(57) ABSTRACT

A charging member is provided which has a low electrical resistance, has less non-uniformity or environmental dependence of the electrical resistance, may less undergo electrification deterioration even when used for a long period of time, and is free of any occurrence of faulty images such as horizontal lines attributable to charging. The charging member is formed of a support with a good electrical conductivity and an elastic layer consisting of at least one layer on the support, and the elastic layer is formed of a semiconductive vulcanized rubber in which carbon black has been dispersed as conductive particles in a binder polymer containing a polymer having a butadiene skeleton, having been modified at a molecular terminal thereof with a specific atomic group.

3 Claims, 8 Drawing Sheets

(56) References Cited

U.S. PATENT DOCUMENTS

| | | | |
|---|---|---|---|
| 5,508,333 A * | 4/1996 | Shimizu | 524/424 |
| 5,652,310 A * | 7/1997 | Hsu et al. | 525/331.9 |
| 5,821,290 A * | 10/1998 | Labauze | 524/188 |
| 6,111,045 A * | 8/2000 | Takagishi et al. | 526/338 |
| 6,268,456 B1 * | 7/2001 | Gregorovich et al. | 528/35 |
| 6,362,272 B1 * | 3/2002 | Tadaki et al. | 524/555 |
| 6,794,428 B2 | 9/2004 | Burrington et al. | |
| 6,992,147 B1 * | 1/2006 | Ozawa et al. | 525/342 |
| 7,288,594 B2 * | 10/2007 | Ozawa et al. | 525/105 |
| 7,342,070 B2 * | 3/2008 | Tsukimawashi et al. | 525/105 |
| 7,366,448 B2 * | 4/2008 | Taniguchi et al. | 399/176 |
| 7,556,904 B2 * | 7/2009 | Kadota et al. | 430/108.1 |
| 7,749,671 B2 * | 7/2010 | Yamamoto et al. | 430/108.6 |
| 7,767,774 B2 * | 8/2010 | Suzuki et al. | 526/194 |
| 7,893,164 B2 * | 2/2011 | Sone et al. | 525/271 |
| 8,063,153 B2 * | 11/2011 | Yan et al. | 525/342 |
| 8,258,213 B2 * | 9/2012 | Miyazaki | 524/83 |
| 8,469,867 B2 * | 6/2013 | Kuroda et al. | 492/56 |
| 2004/0254301 A1 | 12/2004 | Tsukimawashi et al. | |
| 2006/0030677 A1 * | 2/2006 | Ozawa et al. | 525/342 |
| 2006/0275686 A1 * | 12/2006 | Kadota et al. | 430/108.1 |
| 2007/0059625 A1 * | 3/2007 | Yamamoto et al. | 430/108.6 |
| 2008/0045664 A1 * | 2/2008 | Sone et al. | 525/271 |
| 2009/0203843 A1 * | 8/2009 | Fukuoka et al. | 525/105 |
| 2010/0150608 A1 | 6/2010 | Mitsumori et al. | 399/159 |
| 2011/0176833 A1 * | 7/2011 | Harada et al. | 399/176 |
| 2012/0108737 A1 * | 5/2012 | Shibata et al. | 524/575 |
| 2012/0141161 A1 * | 6/2012 | Watanabe et al. | 399/111 |
| 2012/0177408 A1 * | 7/2012 | Watanabe et al. | 399/176 |
| 2012/0224887 A1 * | 9/2012 | Harada et al. | 399/168 |
| 2013/0018151 A1 * | 1/2013 | Maeda et al. | 525/102 |

FOREIGN PATENT DOCUMENTS

| | | | |
|---|---|---|---|
| CN | 1862406 A | 11/2006 | |
| JP | 9-90714 A | 4/1997 | |
| JP | 9-127760 A | 5/1997 | |
| JP | 2003-64104 A | 3/2003 | |
| JP | 2003-313437 A | 11/2003 | |
| JP | 2006-350097 A | 12/2006 | |
| JP | 2007-155769 A | 6/2007 | |
| JP | 2007-292298 A | 11/2007 | |
| JP | 2008-033100 A | 2/2008 | |
| JP | 2008033100 A * | 2/2008 | G03G 15/00 |

OTHER PUBLICATIONS

Notification of Transmittal of Translation of the International Preliminary Report on Patentability (Chapter I or Chapter II) mailed Jul. 12, 2012, in International Application No. PCT/JP2010/006720.

Notification Concerning Transmittal of International Preliminary Report on Patentability (Chapter I of the Patent Cooperation Treaty) mailed Jul. 5, 2012, in International Application No. PCT/JP2010/006720.

International Preliminary Report on Patentability issued Jul. 4, 2012, in International Application No. PCT/JP2010/006720.

Written Opinion of the International Searching Authority (Translation) mailed Dec. 14, 2010, in International Application No. PCT/JP2010/006720.

Chinese Office Action dated May 15, 2014, in related Chinese Patent Application No. 201080055938.3 (with English translation).

* cited by examiner

CHARGING MEMBER, ELECTROPHOTOGRAPHIC APPARATUS AND PROCESS CARTRIDGE

CROSS-REFERENCE TO RELATED APPLICATIONS

This application is a continuation of International Application No. PCT/JP2010/006720, filed Nov. 16, 2010, which claims the benefit of Japanese Patent Application No. 2009-290917, filed Dec. 22, 2009.

BACKGROUND OF THE INVENTION

1. Field of the Invention

This invention relates to a charging member, an electrophotographic apparatus and a process cartridge.

2. Description of the Related Art

An elastic-material layer of a charging roller used in a contact charging system usually has an electrical conductivity of approximately from $1\times10^3$ to $1\times10^7$ Ω·cm in volume resistivity. In order to obtain an elastic-material layer having such an electrical conductivity, an electro-conductivity type conductive rubber composition compounded with conductive particles such as carbon black may be used to form the elastic-material layer. This is disclosed in Japanese Patent Application Laid-open No. H09-090714.

However, the elastic-material layer thus formed has, as disclosed in Japanese Patent Application Laid-open No. H09-090714, a problem that its electrical resistance depends so strongly on the state of dispersion of the conductive particles as to tend to cause resistance non-uniformity in the charging roller. Also, in the charging member having such an elastic-material layer, the conductive particles in the elastic-material layer may faster come to aggregate because of continuous application of direct-current voltage, to make the elastic-material layer change gradually in its electrical resistance.

Japanese Patent Application Laid-open No. 2007-292298 discloses that a bead mill may be used when the conductive particles such as carbon black are dispersed in a material for forming a conductive coat layer of the charging member and this enables achievement of the resolution of the problem that the charging member layer may change in electrical resistance with its service.

SUMMARY OF THE INVENTION

The present inventors have confirmed that the invention according to Japanese Patent Application Laid-open No. 2007-292298 is effective in resolving the problem that the charging member having the elastic-material layer formed by using the electro-conductivity type conductive rubber composition may change with time in its electrical resistance. However, in order to much more keep the electrical resistance from varying with use of the charging member, they have realized that further technical development must be made. Accordingly, the present inventors have made studies so that the above problem can be resolved in an aspect of materials. As the result, they have found that a polymer having a butadiene skeleton, having a specific terminal-modified group, may be used as a binder polymer serving as a material for the elastic-material layer and this is very effective in resolving the above problem.

The present invention is directed to provide a charging member that can have a uniform electrical resistance, cannot easily change in electrical resistance even by any long-term continuous electrification and, as a result thereof, may cause less change in its charging performance with time. The present invention is directed to also provide an electrophotographic apparatus, and a process cartridge, that can form high-grade electrophotographic images stably.

According to one aspect of the present invention, there is provided a charging member comprising a conductive support and an elastic layer; wherein said elastic layer comprises a vulcanized rubber; and wherein said vulcanized rubber is a vulcanized product of a composition comprising: i) a binder which comprises a polymer having a butadiene skeleton, said polymer being represented by the following formula (1) or (2) and ii) conductive carbon black having been dispersed in the binder:

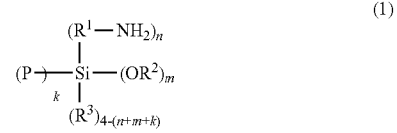

In the structural formula (1), P represents a chain of the polymer having a butadiene skeleton; $R^1$ is an alkylene group having 1 to 12 carbon atom(s); $R^2$ and $R^3$ are each independently an alkyl group having 1 to 20 carbon atom(s); and n is an integer of 1 or 2, m is an integer of 1 or 2 and k is an integer of 1 or 2, provided that the value of n+m+k is an integer of 3 or 4.

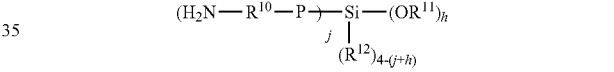

In the structural formula (2), P represents a chain of the polymer having a butadiene skeleton; $R^{10}$ is an alkylene group having 1 to 12 carbon atom(s); $R^{11}$ and $R^{12}$ are each independently an alkyl group having 1 to 20 carbon atom(s); and j is an integer of 1 to 3 and h is an integer of 1 to 3, provided that the value of j+h is an integer of 2 to 4.

According to another aspect of the present invention, there is provided an electrophotographic apparatus comprising the above charging member, and an electrophotographic photosensitive member which is so disposed as to be electrostatically chargeable by the charging member. According to further aspect of the present invention, there is provided a process cartridge comprising the above charging member, and is so constituted as to be detachably mountable to the main body of the electrophotographic apparatus.

According to the present invention, a charging member can be obtained that may less change in electrical resistance even as a result of any long-term service and contributes to stable formation of high-grade electrophotographic images. According to the present invention, an electrophotographic apparatus and a process cartridge for use in the electrophotographic apparatus can also be obtained that can provide high-grade electrophotographic images stably.

Further features of the present invention will become apparent from the following description of exemplary embodiments with reference to the attached drawings.

DESCRIPTION OF THE EMBODIMENTS

Charging Member

Figure 2:
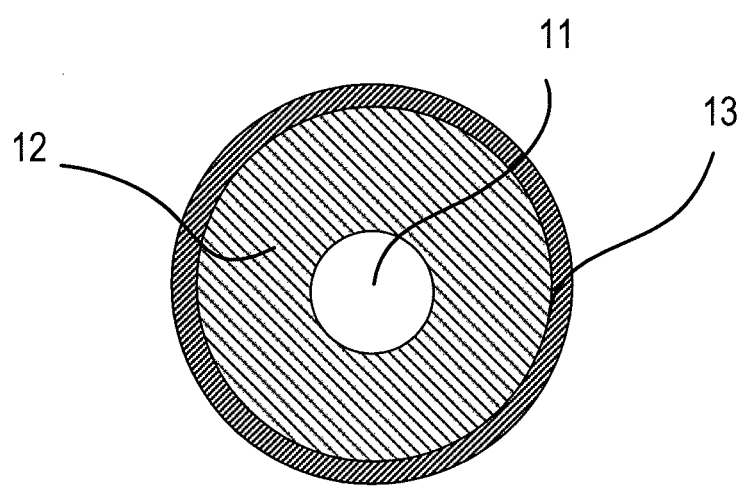
FIG. 2 is a sectional view of a charging roller according to the present invention.

The charging roller according to the present invention is described below with reference to FIG. 2. That is, a charging roller 1 according to the present invention has a mandrel 11 and provided on its peripheral surface an elastic layer 12 and a surface layer 13 as an option.

Elastic Layer:

The elastic layer 12 contains a vulcanized rubber. The vulcanized rubber is a vulcanized product of a composition which contains i) a binder containing a polymer having a butadiene skeleton and ii) conductive carbon black as conductive particles having been dispersed in the binder.

Then, the polymer having a butadiene skeleton has a structure represented by the following structural formula (1) or the following structural formula (2).

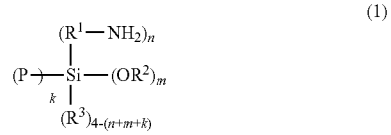
(1)

In the structural formula (1), P represents a chain of the polymer having a butadiene skeleton; $R^1$ is an alkylene group having 1 to 12 carbon atom(s); $R^2$ and $R^3$ are each independently an alkyl group having 1 to 20 carbon atom(s); and n is an integer of 1 or 2, m is an integer of 1 or 2 and k is an integer of 1 or 2, provided that the value of n+m+k is an integer of 3 or 4.

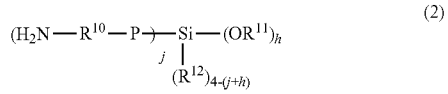
(2)

In the structural formula (2), P represents a chain of the polymer having a butadiene skeleton; $R^{10}$ is an alkylene group having 1 to 12 carbon atom(s); $R^{11}$ and $R^{12}$ are each independently an alkyl group having 1 to 20 carbon atom(s); and j is an integer of 1 to 3 and h is an integer of 1 to 3, provided that the value of j+h is an integer of 2 to 4.

That is, the polymer having a butadiene skeleton, which is a constituent material of the elastic layer according to the present invention, has a primary amino group and an alkoxysilyl group at its terminal or has a primary amino group and an alkoxysilyl group respectively at both terminals thereof.

In the polymer having the structure represented by the structural formula (1) or structural formula (2), a cation is considered to come at the alkoxysilyl group on account of the heat, shear force or the like produced when it is kneaded with the carbon black in forming the elastic layer. It is presumed that the cation having thus come thereat acts on a functional group (such as hydroxyl, quinone, ester, carboxyl or ether) present on each carbon black particle surface to form a chemical linkage between the polymer and the carbon black. Then, this feature that the polymer and the carbon black combine chemically with each other allows the carbon black to be finely dispersed to make stable the state of dispersion of the carbon black in the binder polymer, as so considered.

Figure 4A:
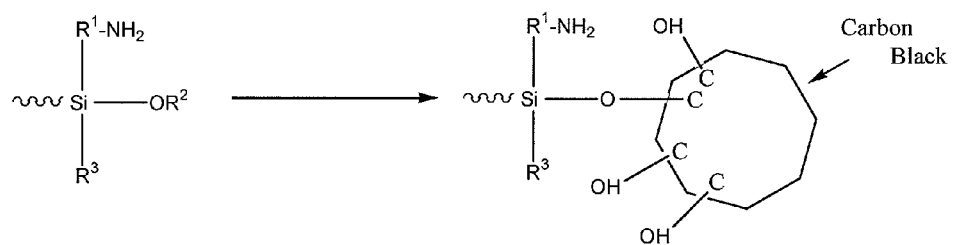
FIG. 4A illustrates how a polymer according to the present invention and carbon black act mutually.
Figure 4B:
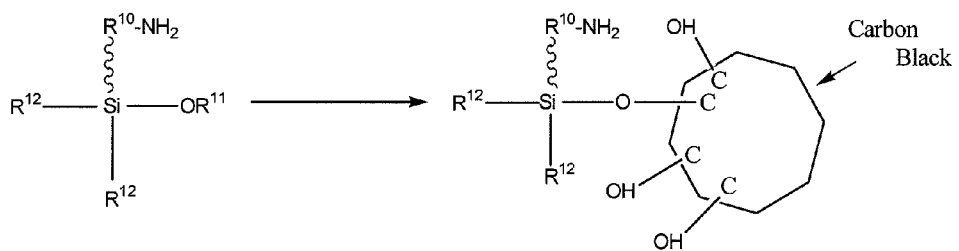
FIG. 4B illustrates how a polymer according to the present invention and carbon black act mutually.

FIG. 4A shows a state in which the alkoxysilyl group at the terminal of the polymer represented by the structural formula (1) reacts with a hydroxyl group present on the surface of a carbon black particle whereupon the polymer and the carbon black has chemically combined with each other. FIG. 4B also shows a state in which the alkoxysilyl group at the terminal of the polymer represented by the structural formula (2) reacts with a hydroxyl group present on the surface of a carbon black particle whereupon the polymer and the carbon black has chemically combined with each other.

Though any detailed mechanism is unclear, the present inventors presume that, in what is shown in the structural formula (1), the amino group bonded to the silicon atom through the alkylene group ($R^1$) contributes in some way to the promotion of the reaction between the alkoxysilyl group at the terminal of the polymer and the functional group on the carbon black particle surface. Likewise, the present inventors presume that, in what is shown in the structural formula (2), the amino group bonded to the polymer through the alkylene group ($R^{10}$) also contributes in some way to the promotion of the reaction between the alkoxysilyl group at the terminal of the polymer and the functional group on the carbon black particle surface. These presumptions are based on the results of experiment that any elastic layers formed by using a polymer having the same structure as that of structural formula (1) except that it does not have any amino group and a polymer having the same structure as that of structural formula (2) except that it does not have any amino group were inferior to the elastic layer according to the present invention in respect of the effect of keeping its electrical resistance from changing with time.

Thus, it is considered that, in the elastic layer according to the present invention, the carbon black has chemically combined with a cross-linked rubber and stands highly dispersed in the cross-linked rubber. As the result, in the elastic layer according to the present invention, the position of the carbon black stands not easily variable even where the charging member has been kept to stand electrified over a long period of time. Hence, the charging member according to the present invention, having such an elastic layer, cannot easily cause any local non-uniformity of electrical resistance even as a result of long-term service, as so considered.

The polymer represented by the structural formula (1) or structural formula (2) and in which P is a chain of a copolymer of a conjugated diolefin and an aromatic divinyl compound may be synthesized by the following method (a) or (b).

(a) In a hydrocarbon solvent, a conjugated diolefin having a butadiene skeleton and an aromatic divinyl compound are allowed to undergo anionic polymerization in the presence of a polymerization initiator containing an organic alkali metal or organic alkaline earth metal. Then, at the time the polymerization has substantially been completed, a compound having a protected primary amino group and an alkoxysilyl group (the compound is hereinafter also termed "terminal-modifying agent") is added to allow it to react at the living polymerization terminal, followed by deprotection (hydrolysis). This method can obtain by one-stage reaction a polymer having a primary amino group and an alkoxysilyl group. In this method, the polymerization reaction and the reaction with the terminal-modifying agent are usually carried out in a temperature range of from 0° C. to 120° C. Also, the hydrolysis for liberating the protected primary amino group of the terminal-modifying agent is carried out in a temperature range of from 80° C. to 150° C., in particular, from 90° C. to 120° C., and for 10 minutes or more, in particular, for 30 minutes or more, with addition of water or acidic water in an amount of 2-fold mole or more of the terminal-modifying agent.

The compound having a protected primary amino group and an alkoxysilyl group may include compounds represented by the following structural formulas (3) and (4).

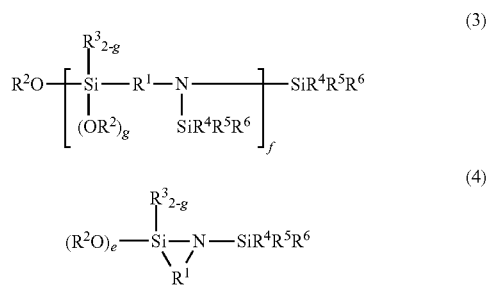

In the structural formulas (3) and (4), $R^1$, $R^2$ and $R^3$ are as defined for the $R^1$, $R^2$ and $R^3$ in the structural formula (1). $R^4$ to $R^6$ each independently represent an alkyl group having 1 to 20 carbon atom(s), an aryl group such as a phenyl group, or an atomic group necessary for any two selected from $R^4$ to $R^6$ to combine to form a 4- to 7-membered ring together with the silicon atom to which these are bonded.

Specific examples of the terminal-modifying agents represented by the structural formulas (3) and (4) are given below:

N,N-bis(trimethylsilyl)aminopropylmethyldimethoxysilane, represented by the following structural formula (5), 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane and N,N-bis(trimethylsilyl)aminoethylmethyldiethoxysilane.

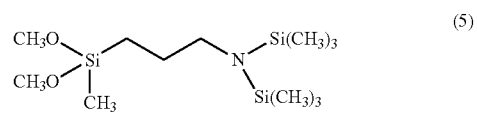

Figure 5:
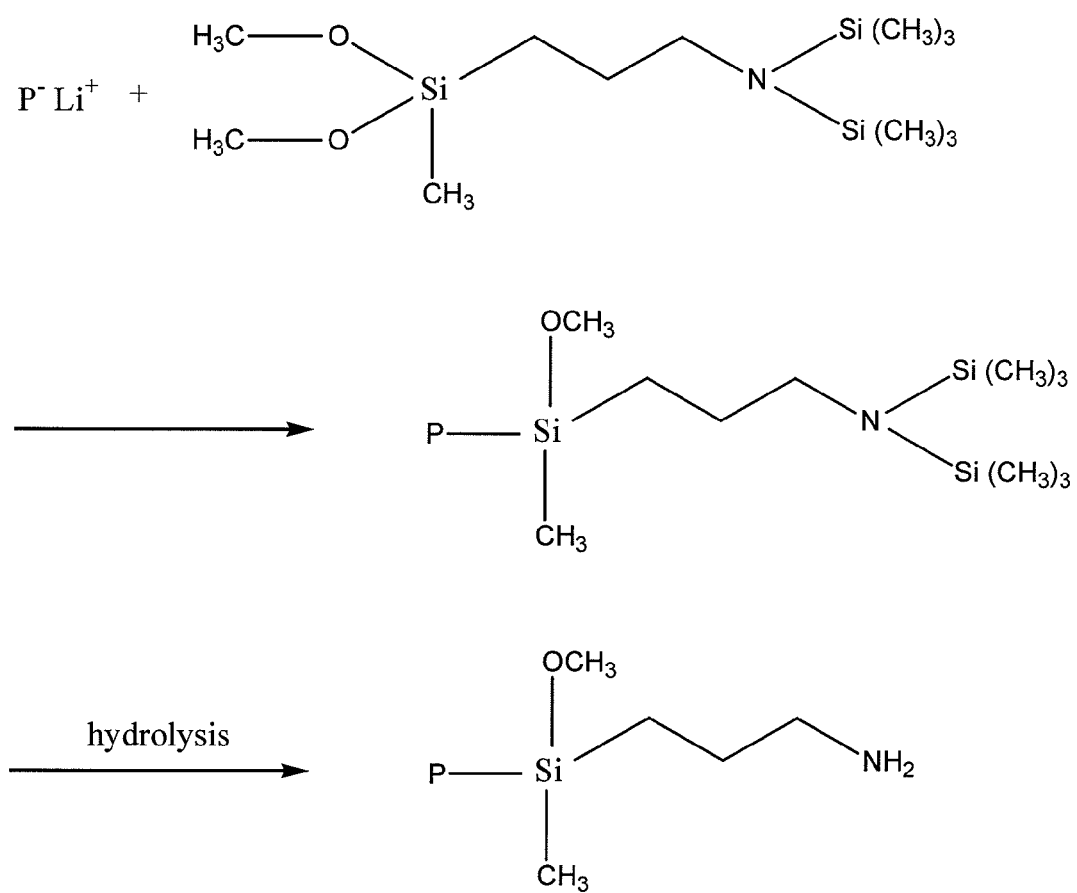
FIG. 5 is a reaction scheme where a living polymerization terminal of a copolymer P of a conjugated diolefin and an aromatic divinyl compound reacts with a compound of structural formula (5).
Figure 6:
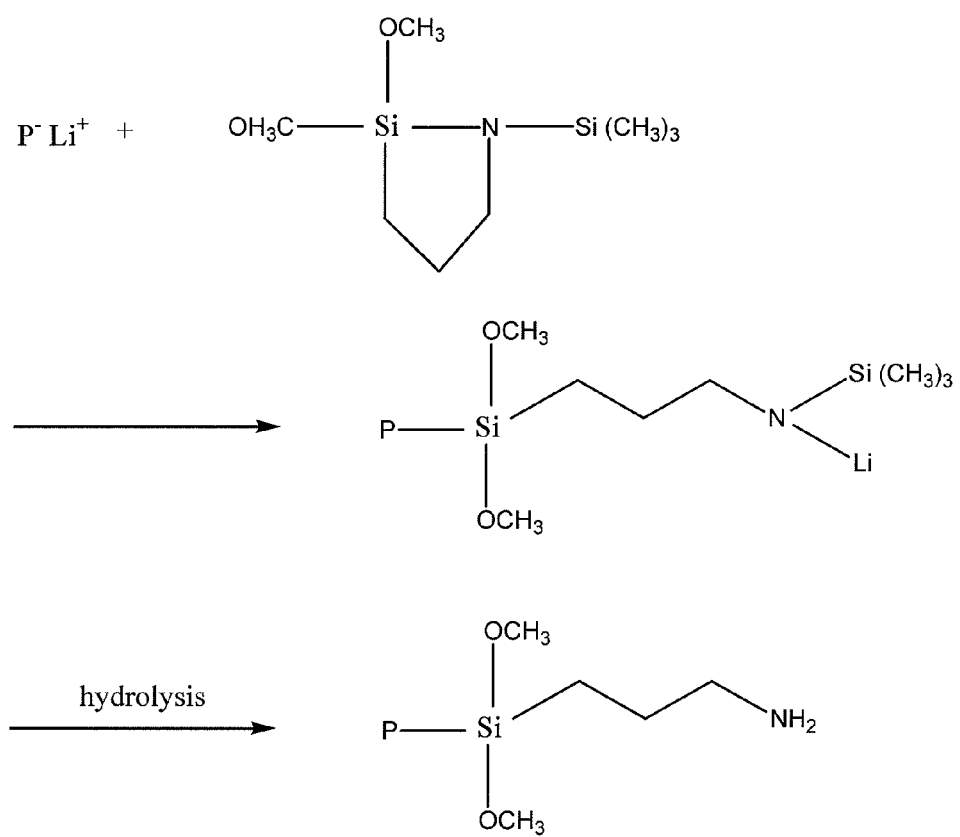
FIG. 6 is a reaction scheme where a living polymerization terminal of the copolymer P of a conjugated diolefin and an aromatic divinyl compound reacts with 1-trimethylsilyl-2,2-dimethoxy-1-aza-2-silacyclopentane.
Figure 7:
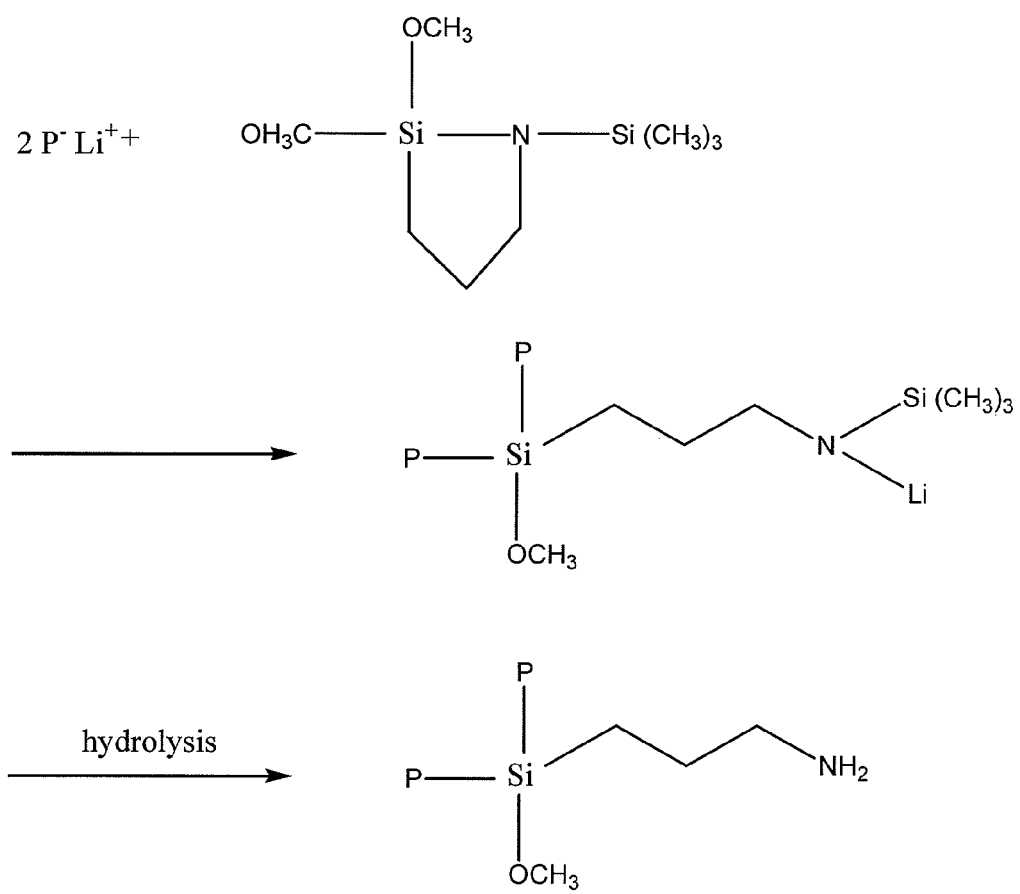
FIG. 7 is a reaction scheme where bimolecular living polymerization terminals of the copolymer P of conjugated diolefin and an aromatic divinyl compound react with 1-trimethylsilyl-2,2-dimethoxy-1-aza-2-silacyclopentane.

Here, a reaction scheme where a living polymerization terminal of a copolymer P of a conjugated diolefin and an aromatic divinyl compound reacts with the compound of structural formula (5) is shown in FIG. 5. A reaction scheme where a living polymerization terminal of the copolymer P of a conjugated diolefin and an aromatic divinyl compound reacts with 1-trimethylsilyl-2,2-dimethoxy-1-aza-2-silacyclopentane is also shown in FIG. 6. Further, the silacyclopentane can react with bimolecular living polymerization terminals, and a reaction scheme of such reaction is shown in FIG. 7.

As the organic alkali metal or organic alkaline earth metal used as a polymerization initiator, an organolithium compound or a lithium amide compound may preferably be used. Where the former organolithium compound is used, a conjugated diene polymer is obtained which has a hydrocarbon group at the polymerization initiation terminal and the other terminal of which is a polymerization activation moiety. Also, where the latter lithium amide compound is used, a conjugated diene polymer is obtained which has a nitrogen-containing group at the polymerization initiation terminal and the other terminal of which is a polymerization activation moiety.

A potassium compound may be added together with the polymerization initiator. Examples of the potassium compound are given below: Potassium alkoxides such as potassium isopropoxide, potassium-t-butoxide, potassium-t-amyloxide, potassium-n-heptaoxide, potassium benzyloxide and potassium phenoxide; potassium salts of organic acids such as isovalerianic acid, capric acid, lauric acid, palmitic acid, stearic acid, oleic acid, linoleic acid, benzoic acid, phthalic acid and 2-ethylhexanoic acid; potassium salts of organosulfonic acids such as dodecylbenzenesulfonic acid, tetradecylbenzenesulfonic acid, hexadecylbenzenesulfonic acid and octadecylbenzenesulfonic acid; and potassium salts of organophosphorous acid partial esters such as diethyl phosphite, diisopropyl phosphite, diphenyl phosphite, dibutyl phosphite and dilauryl phosphite. As the solvent used in polymerization, a hydrocarbon solvent may be used, for example. Examples of the hydrocarbon solvent are given below: Pentane, hexane, heptane, octane, methylcyclopentane, cyclohexane, benzene, toluene and xylene. In particular, cyclohexane and heptane are preferred.

(b) In a hydrocarbon solvent, a conjugated diolefin and an aromatic vinyl compound are allowed to undergo anionic polymerization in the presence of a lithium amide initiator represented by the following structural formula (6) or (7). Then, at the time the polymerization has substantially been completed, an alkoxysilane compound represented by the following structural formula (8) is added to allow it to react at the living polymerization terminal, followed by hydrolysis. In this method, the polymerization reaction in the presence of the lithium amide initiator and the reaction with the alkoxysilane compound are carried out in a temperature range of from 0° C. to 120° C. Also, the hydrolysis for liberating the protective group of the primary amino group is carried out in the same way as that in the method (a).

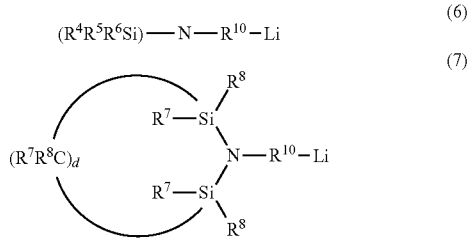

(6)

(7)

In the structural formula (6) or (7), $R^4$ to $R^6$ each independently represent an alkyl group having 1 to 20 carbon atom(s), an aryl group such as a phenyl group, or an atomic group necessary for any two selected from $R^4$ to $R^6$ to combine to form a 4- to 7-membered ring together with the silicon atom to which these are bonded; $R^7$ and $R^8$ each independently represent a hydrogen atom, an alkyl group having 1 to 20 carbon atom(s), or an aryl group such as a phenyl group; and d is an integer of 1 to 7.

(8)

In the structural formula (8), $R^2$ and $R^3$ are as defined for the $R^2$ and $R^3$ in the structural formula (2); X represents a halogen element; and j is an integer of 1 to 3 and h is an integer of 1 to 3, provided that the value of j+h is an integer of 2 to 4.

The polymer having a butadiene skeleton according to the present invention may include as an example thereof any copolymer of a conjugated diolefin and an aromatic vinyl compound.

Specific examples of the conjugated diolefin are given below: 1,3-Butadiene, isoprene, 2,3-dimethyl-1,3-butadiene, 2-chloro-1,3-butadiene, 1,3-pentadiene and 1,3-hexadiene, or mixtures of any of these. Of these, 1,3-butadiene is particularly preferred because an elastic layer that is superior in the effect of keeping its electrical resistance from deteriorating with time can be formed.

Specific examples of the aromatic vinyl compound are given below: Styrene, 2-methylstyrene, 3-methylstyrene, 4-methylstyrene, α-methylstyrene, 2,4-dimethylstyrene, 2,4-diisopropylstyrene, 4-tert-butylstyrene, divinylbenzene, vinylbenzyldimethylamine, (4-vinylbenzyl)dimethylaminoethyl ether, vinylpyridine, p-methylstyrene, vinyltoluene, and vinylnaphthalene. In particular, styrene is especially preferred.

Besides the terminal-modified polymer as described above, the binder polymer may also contain other polymer. Specific examples of such other polymer are given below: Natural rubber (NR), isoprene rubber (IR), butadiene rubber (BR), styrene-butadiene rubber (SBR), butyl rubber (IIR), an ethylene-propylene-diene terpolymer rubber (EPDM), an epichlorohydrin homopolymer (CHC), an acrylonitrile-butadiene copolymer (NBR), chloroprene rubber (CR), and acrylic rubbers (ACM, ANM).

In the present invention, the elastic layer contains carbon black serving as conductive particles. The carbon black may be compounded in such an amount that is so controlled that the electrical resistance of the elastic layer may be the desired value. The carbon black may be compounded in the composition in an amount of, stated roughly, from 30 parts by mass to 70 parts by mass, based on 100 parts by mass of the polymer having a butadiene skeleton.

As types of the carbon black to be compounded, there are no particular limitations thereon. Specific examples of the carbon black that may be used are given below: Gas furnace black, oil furnace black, thermal black, lamp black, acetylene black, and KETJEN BLACK.

The number of particle surface functional groups of carbon black that is concerned with the formation of the chemical linkage with the polymer is indicated by the pH of carbon black that is measured according to DIN ISO 787/9 and the volatile component of carbon black that is measured according to DIN 53552. It means that, the smaller the pH value of carbon black is, the larger the number of the particle surface functional groups is. It also follows that, the larger the amount of its volatile component is, the larger the number of the particle surface functional groups is. Then, the larger the number of the particle surface functional groups is, the stronger the linkage between the carbon black and the polymer is. Hence, the carbon black may preferably have the pH in the range of from 3 to 9, and the carbon black may also preferably have the volatile component in the range of from 0.3 wt. % to 5.0 wt. %.

To the composition, a filler, a processing aid, a cross-linking auxiliary agent, a cross-linking accelerator, a cross-linking accelerator activator, a cross-linking retarder, a softening agent, a plasticizer, a dispersant and so forth may further optionally be added which are commonly used as compounding agents for rubbers.

As methods for mixing these raw materials, they may be exemplified by a mixing method making use of a closed mixing machine such as Banbury mixer or a pressure kneader and a mixing method making use of an open mixing machine such as an open roll.

The elastic layer may be formed, e.g., in the following way.

(1) A method in which an unvulcanized composition is extruded in the shape of a tube by means of an extruder and this extruded product is vulcanized by means of a vulcanizing pan to obtain a tube, then a mandrel is press-fitted thereinto, and thereafter the surface of the tube is sanded to give the desired outer diameter.

(2) A method in which a composition having been vulcanized to a certain degree is co-extruded into cylindrical shape setting a mandrel at the center, by means of an extruder fitted with a cross-head, and fixed to the interior of a mold having the desired outer diameter, followed by heating to obtain a molded product.

In order to keep any dirt such as toner and paper dust from sticking to the surface of the charging member, the surface of the elastic layer may be irradiated with ultraviolet rays, electron rays or the like so as to be subjected to surface modification. A surface layer may also, be so formed as to cover therewith the elastic layer on its peripheral surface. As the surface layer, a film may be used which is formed of a binder in which carbon black has been dispersed. Here, as the binder, an acrylic polymer, polyurethane, polyamide, polyester or polyolefin may be used, for example. As the surface layer, a sol-gel film may also be used which is composed of a polysiloxane having an oxyalkylene group, such as silicone.

As a method for forming the surface layer, a method is available in which a coating fluid prepared by dissolving or dispersing the above materials in a solvent is coated on the surface of the elastic layer by a coating method such as dipping, ring coating, beam coating, roll coating or spraying. Incidentally, besides the elastic layer and the surface layer, the charging roller in an embodiment of the present invention may optionally be provided with an adhesion layer, a diffusion preventive layer, a subbing layer or a primer layer.

—Electrophotographic Apparatus—

Figure 1:
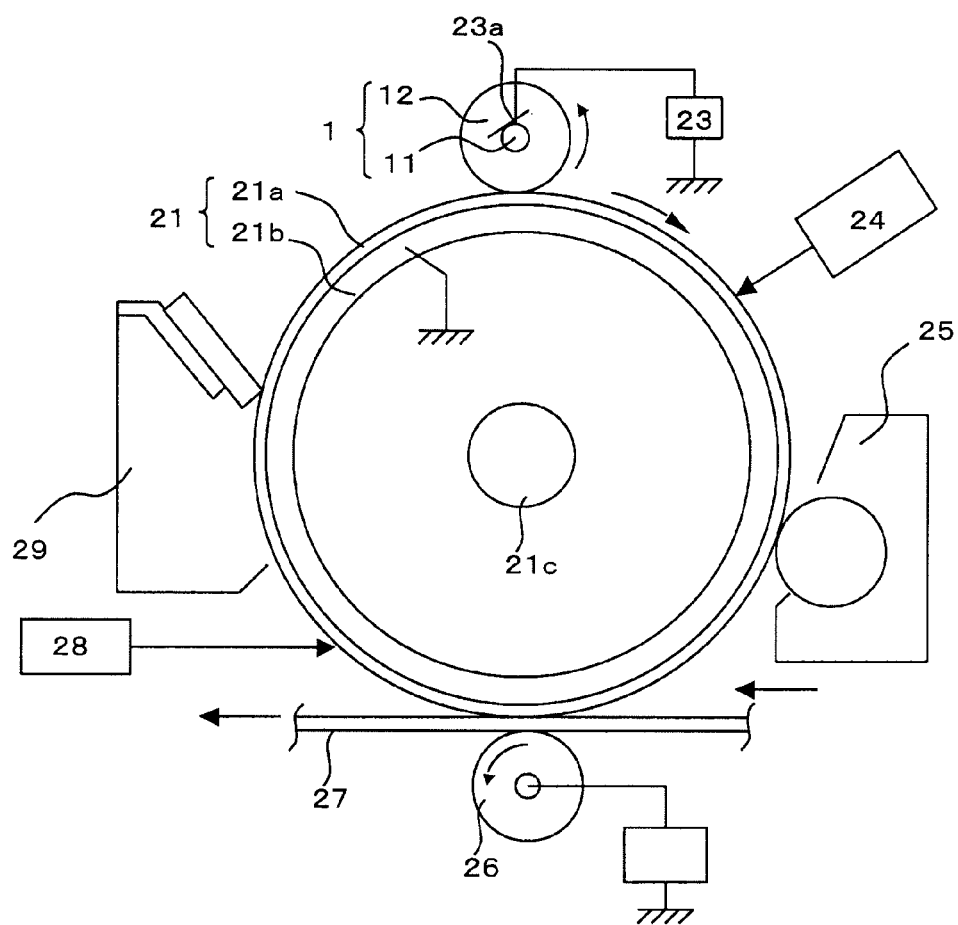
FIG. 1 is a sectional view of an electrophotographic apparatus according to the present invention.

An electrophotographic apparatus having the charging member according to the present invention is shown in FIG. 1 as a sectional view. An electrophotographic photosensitive member 21 is a drum-shaped electrophotographic photosensitive member having, as basic constituent layers, a conductive support 21b having conductivity, made of aluminum or the like, and a photosensitive layer 21a formed on the conductive support 21b. It is rotatingly driven around a shaft 21c in the clockwise direction as viewed on the drawing, at a stated peripheral speed.

A charging roller 1 according to the present invention is kept pressed against the electrophotographic photosensitive member 21 under application of pressure at both end portions of a mandrel 11 by means of a press-down means (not shown). Then, it is follow-up rotated as the electrophotographic photosensitive member 21 is rotatingly driven. A stated direct-current (DC) bias is applied to the mandrel 21 through a rubbing-friction electrode 23a from a power source 23, whereupon the electrophotographic photosensitive member 21 is electrostatically charged to a stated polarity and potential.

The electrophotographic photosensitive member 21 the peripheral surface of which has electrostatically been charged by means of the charging roller 1 is subsequently subjected to exposure (e.g., laser beam scanning exposure, or slit exposure of images of an original) of intended image information by means of an exposure means 24, whereupon electrostatic latent images corresponding to the intended image information are formed on its peripheral surface.

The electrostatic latent images are then successively developed into visible images as toner images by means of a developing member 25. The toner images thus formed are then successively transferred by a transfer means 26 to a transfer material 27 having been transported from a paper feed means section (not shown) to a transfer zone between the electrophotographic photosensitive member 21 and the transfer means 26 at proper timing in the manner synchronized with the rotation of the electrophotographic photosensitive member 21. The transfer means 26 in this example is a transfer roller, which is charged to a polarity reverse to that of toner from the back of the transfer material 27, whereupon the toner images on the side of the electrophotographic photosensitive member 21 are transferred on to the transfer material 27.

The transfer material 27 to which the toner images have been transferred is separated from the electrophotographic photosensitive member 21 and then transported to a fixing means (not shown), where the toner images are fixed. The transfer material with fixed images is put out as an image-formed matter. Instead, where images are also formed on the back, the transfer material with fixed images is transported to a means for re-transporting it to the transfer zone. The peripheral surface of the electrophotographic photosensitive member 21 from which the toner images have been transferred is subjected to pre-exposure by a pre-exposure means 28, whereby electric charges remaining on the electrophotographic photosensitive member 21 are removed (destaticized).

—Process Cartridge—

Figure 8:
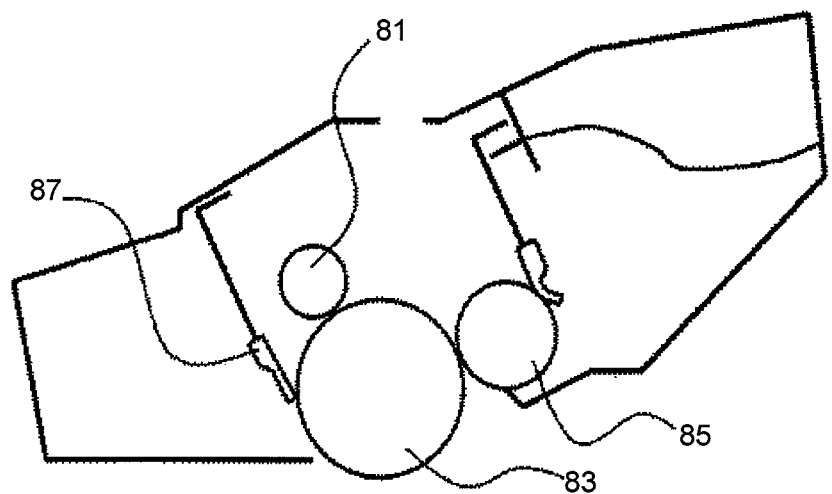
FIG. 8 is a sectional view of a process cartridge having the charging roller according to the present invention.

FIG. 8 is a sectional view of a process cartridge according to an embodiment of the present invention, having a charging roller 81 according to the present invention and being so set up as to be detachably mountable to the main body of the electrophotographic apparatus. In the process cartridge shown in FIG. 8, an electrophotographic photosensitive drum 83 is so disposed as to be chargeable by a charging roller 81. Reference numeral 85 denotes a developing roller with which a developer for developing electrostatic latent images is fed to the surface of the electrophotographic photosensitive drum 83. Further, reference numeral 87 denotes a cleaning blade with which any developer remaining on the peripheral surface of the electrophotographic photosensitive drum 83 is removed. Incidentally, the process cartridge according to the present invention is not limited to what is shown in FIG. 8, and, e.g., what has one or both of the electrophotographic photosensitive drum 83 and the developing roller 85 is also, within the scope of the present invention.

EXAMPLES

The present invention is described below in greater detail by giving working examples. In the following, "part(s)" refers to "part(s) by mass" unless particularly noted. As reagents and the like, commercially available high-purity products are used unless particularly specified.

—Syntheses of Terminal-Modified Polymers—

Terminal-Modified Copolymer Rubber 1

Into an autoclave having an inner volume of 15 liters the internal atmosphere of which was displaced with nitrogen, materials shown in Table 1-1 below were fed.

TABLE 1-1

| Cyclohexane | 8,250 | g |
| Tetrahydrofuran | 123.9 | g |
| Styrene | 375 | g |
| 1,3-Butadiene | 1,095 | g |
| Potassium dodecylbenzenesulfonate | 294 (0.81 | mg mmol) |

After the temperature of the contents in the autoclave was controlled to 20° C., 645 mg (10.08 mmol) of n-butyllithium was added to those in the autoclave to initiate polymerization. At a point in time where the polymerization conversion reached 99%, 30 g of 1,3-butadiene was added to carry out the polymerization further for 5 minutes. Thereafter, 3,381 mg of N,N-bis(trimethylsilyl)aminopropylmethyldimethoxysilane was added to carry out reaction for 15 minutes. To the polymer solution obtained by the reaction, 2,6-di-t-butyl-p-cresol was added, and thereafter the polymer thus formed was allowed to coagulate. Then, this was dried under reduced pressure at a temperature of 60° C. for 24 hours to obtain a terminal-modified styrene-butadiene copolymer (Terminal-modified Copolymer Rubber 1).

Terminal-Modified Copolymer Rubber 2

Into an autoclave having an inner volume of 15 liters the internal atmosphere of which was displaced with nitrogen, materials shown in Table 1-2 below were fed.

TABLE 1-2

| Cyclohexane | 8,250 | g |
| Tetrahydrofuran | 123.9 | g |
| Styrene | 375 | g |
| 1,3-Butadiene | 990 | g |
| Isoprene | 90 | g |
| Potassium dodecylbenzenesulfonate | 294 (0.81 | mg mmol) |

After the temperature of the contents in the autoclave was controlled to 20° C., 645 mg (10.08 mmol) of n-butyllithium was added thereto to initiate polymerization. At a point in time where the polymerization conversion reached 99%, 30 g of isoprene was added to carry out the polymerization further for 5 minutes. Thereafter, 3,381 mg of N,N-bis(trimethylsilyl)aminopropylmethyldimethoxysilane was added to carry out reaction for 15 minutes. To the polymer solution obtained by the reaction, 2,6-di-t-butyl-p-cresol was added, and thereafter the polymer thus formed was allowed to coagulate. Then, this was dried under reduced pressure at 60° C. for 24 hours to obtain a terminal-modified copolymer rubber having a butadiene skeleton (Terminal-modified Copolymer Rubber 2).

Terminal-Modified Copolymer Rubber 3

Into an autoclave having an inner volume of 15 liters the internal atmosphere of which was displaced with nitrogen, materials shown in Table 1-3 below were fed.

TABLE 1-3

| Cyclohexane | 8,250 g |
|---|---|
| Tetrahydrofuran | 123.9 g |
| 1,3-Butadiene | 1,370 g |

After the temperature of the contents in the autoclave was controlled to 20° C., 645 mg (10.08 mmol) of n-butyllithium was added thereto to initiate polymerization. At a point in time where the polymerization conversion reached 99%, 30 g of 1,3-butadiene was added to carry out the polymerization further for 5 minutes. Thereafter, 3,381 mg of N,N-bis(trimethylsilyl)aminopropylmethyldimethoxysilane was added to carry out reaction for 15 minutes. To the polymer solution obtained by the reaction, 2,6-di-t-butyl-p-cresol was added, and thereafter the polymer thus formed was allowed to coagulate. Then, this was dried under reduced pressure at 60° C. for 24 hours to obtain a terminal-modified copolymer rubber having a butadiene skeleton (Terminal-modified Copolymer Rubber 3).

Terminal-Modified Copolymer Rubber 4

A terminal-modified copolymer rubber (Terminal-modified Copolymer Rubber 4) was obtained in the same way as Terminal-modified Copolymer Rubber 1 except that as the terminal-modifying agent the N,N-bis(trimethylsilyl)aminopropylmethyldimethoxysilane was changed for N,N-bis(trimethylsilyl)aminopropyltriethoxysilane.

Unmodified Copolymer Rubber 1

Unmodified Copolymer Rubber 1 was obtained in the same way as Terminal-modified Copolymer Rubber 1 except that the terminal-modifying agent N,N-bis(trimethylsilyl)aminopropylmethyldimethoxysilane was not added.

Unmodified Copolymer Rubber 2

Unmodified Copolymer Rubber 2 was obtained in the same way as Terminal-modified Copolymer Rubber 3 except that the terminal-modifying agent N,N-bis(trimethylsilyl)aminopropylmethyldimethoxysilane was not added.

Example 1

Preparation of Material Rubber

Materials shown in Table 1-4 below were mixed by means of a 3-liter pressure kneader for 16 minutes in a packing of 65 vol. % and at a number of blade revolutions of 30 rpm to obtain an unvulcanized rubber composition.

TABLE 1-4

| Terminal-modified Copolymer Rubber 1 | 100 parts |
|---|---|
| Zinc stearate | 1 part |
| Zinc oxide | 5 parts |

TABLE 1-4-continued

| Carbon black (trade name: REGAL 660; available from Cabot Corp.; pH: 7.5; volatile component: 1.0 wt. %) | 50 parts |
|---|---|

To 156 parts of this unvulcanized rubber composition, materials shown in Table 1-5 below were added, and these were mixed by means of an open roll of 12 inches in roll diameter, for 20 minutes at a number of front-roll revolutions of 8 rpm and a number of back-roll revolutions of 10 rpm and at a roll gap of 2 mm to obtain an unvulcanized rubber composition for elastic layer.

TABLE 1-5

| Sulfur | 1.2 parts |
|---|---|
| Tetrabenzylthiuram disulfide (trade name: NOCCELLER TBzTD; available from Ohuchi-Shinko Chemical Industrial Co., Ltd.) | 1.0 part |
| N-t-butyl-2-benzothiazole sulfenimide (trade name: SANTOCURE-TBSI; available from FLEXSYS) | 1.0 part |

Forming for Charging Roller:

The unvulcanized rubber composition obtained was extruded in the shape of a tube by means of a vented rubber extruder (a vented extruder of 45 mm in diameter; L/D: 20; manufactured by Nakata Engineering Co., Ltd.), and this extruded product was subjected to primary vulcanization at 160° C. for 30 minutes under power steam by means of a vulcanizing pan. Thus, a rubber tube of 10 mm in outer diameter, 5.5 mm in inner diameter and 250 mm in length was obtained.

Next, a columnar conductive mandrel (made of steel and plated with nickel on its surface) of 6 mm in diameter and 252 mm in length was coated with a conductive hot melt adhesive over the column surface on its middle portion of 232 mm in axial direction, followed by drying at 80° C. for 30 minutes. This mandrel coated with the adhesive was press-fitted into the above rubber tube, and then this rubber tube was subjected to secondary vulcanization and bond treatment at 160° C. for 30 hours in a hot-air oven. The composite body obtained was cut off at its both end portions to produce an unsanded roller of 232 mm in length at its rubber portion. This unsanded roller was sanded at its rubber portion by means of a sander (trade name: LEO-600-F4-BME, manufactured by Minakuchi Machinery Works Ltd.) to obtain a rubber roller having an elastic layer, having a crown shape of 8.35 mm in end-portion diameter and 8.50 mm in middle-portion diameter.

The rubber roller obtained was irradiated with ultraviolet rays on its surface to carry out surface modification treatment. This surface treatment was carried out by irradiating the surface with ultraviolet rays of 254 nm in wavelength in such a way that the integrated amount of light came to 8,500 mJ/cm$^2$, and a low-pressure mercury lamp manufactured by Harison Toshiba Lighting Corporation was used in the irradiation with ultraviolet rays. Thus, a charging roller 1 was produced.

Figure 3:
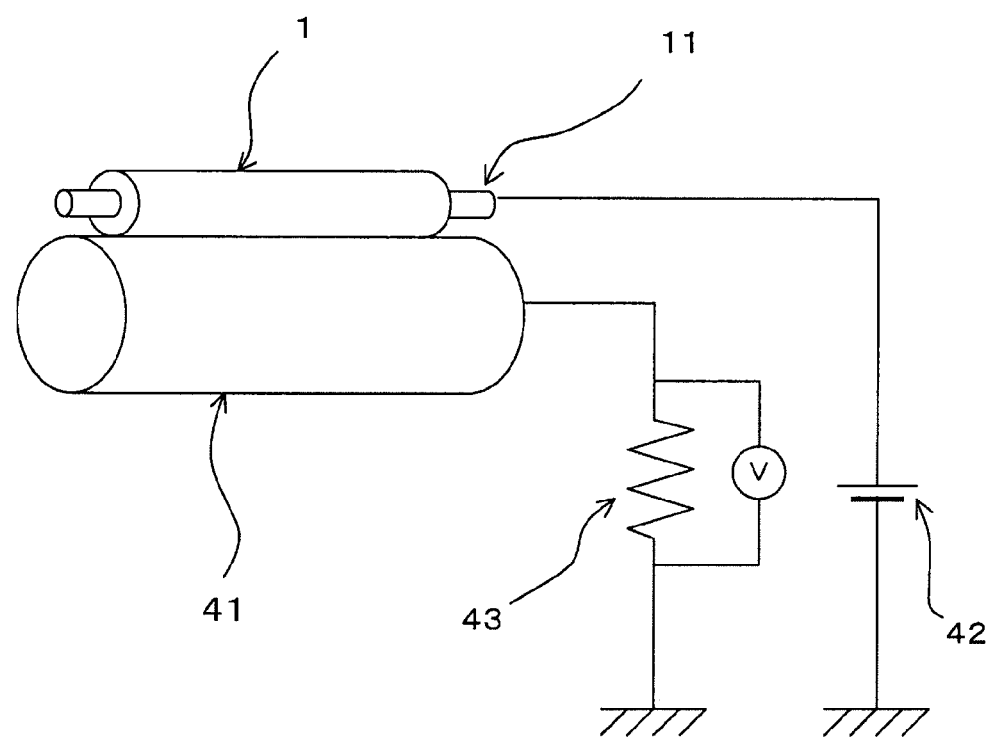
FIG. 3 illustrates how to measure electrical resistance.

Measurement of electrical resistance, peripheral non-uniformity of electrical resistance, environmental dependence, and electrification deterioration:

FIG. 3 schematically shows an instrument with which the electrical resistance of a charging roller is measured. A charging roller 1 is kept pressed against a cylindrical aluminum drum 41 under application of pressure at both end portions of a mandrel 11 by means of a press-down means (not shown), and is follow-up rotated as the aluminum drum 41 is rotatingly driven. In this state, a DC voltage is applied to the part of the mandrel 11 of the charging roller 1 by the use of an power source 42, where the voltage applied to a standard resistance 43 connected to the aluminum drum 41 in series is measured. The electrical resistance of the charging roller 1 may be calculated by finding the value of electric current flowing through the circuit, from the voltage of the standard resistance 43, thus measured.

The electrical resistance of the charging roller 1 was measured under application of a DC voltage of 200 V across the mandrel and the aluminum drum for 2 seconds in an environment of temperature 23° C. and humidity 50% RH (hereinafter also noted as "NN") and using the instrument shown in FIG. 3. In this measurement, the number of revolutions of the aluminum drum was 30 rpm, and the value of resistance of the standard resistance was 100 ohms.

Data were sampled at a frequency of 20 Hz at intervals of 1 second after 1 second lapsed after the voltage was applied, and an average value of the electrical resistance values obtained was taken as the resistance value of the charging roller A. Also, on the basis of the ratio of the maximum electrical resistance to the minimum electrical resistance thus measured, the peripheral non-uniformity of electrical resistance of the charging roller 1 was measured.

The above measurement of electrical resistance was also made in an environment of 15° C. and 10% RH (hereinafter also noted as "LL") and in an environment of 30° C. and 80% RH (hereinafter also noted as "HH"). Then, the ratio of the electrical resistance value in the LL environment to that in the HH environment, LL/HH, was indicated as the environmental dependence of electrical resistance.

In regard to the charging roller 1, any change in electrical resistance at the time of its continuous electrification was also measured. The instrument shown in FIG. 3 was used, and, in the same way as the above measurement of electrical resistance, a DC voltage of 200 V was applied across the mandrel and the aluminum drum for 2 seconds to measure the value of electrical resistance at the initial stage. In this measurement, the number of revolutions of the aluminum drum was 30 rpm, and the value of resistance of the standard resistance was 100 ohms. Next, while the aluminum drum was rotated at 30 rpm, a DC voltage of 200 V was applied across the mandrel and the aluminum drum for 10 seconds. Thereafter, the electrical resistance of the charging roller was again measured in the same way as the above measurement of the electrical resistance at the initial stage. The value of electrical resistance at the initial stage was divided by the value of electrical resistance after the continuous application of the voltage, where the value found was multiplied by 100 and the resultant value was taken as resistance retentivity (%).

Measurement of Hardness:

The hardness of the charging roller 1 was measured with a microhardness meter (trade name: MD-1 capa, Type A; manufactured by Koubunshi Keiki Co., Ltd.), and was measured in a peak hold mode in an environment of temperature 23° C. and relative humidity 55% RH. Stated more specifically, the charging member was placed on a plate made of a metal, and a block made of a metal was placed to simply fasten the charging member so as not to roll over, where a measuring terminal was pressed against the metal plate accurately at the center of the charging member in the vertical direction, where a value after 5 seconds was read. This was measured at both end portions positioned 30 to 40 mm away from rubber ends of the charging member and the middle portion thereof, and at 3 spots each in the peripheral direction, i.e., at 9 spots in total. An average value of the measured values obtained was taken as the hardness of the elastic layer.

Image Evaluation:

The charging roller produced (a member other than what was used to measure the electrical resistance and hardness) was set in an electrophotographic process cartridge, and this process cartridge was set in a laser beam printer (trade name: LBP 5050; manufactured by CANON INC.) for A4-size sheet lengthwise image reproduction. Then, this laser beam printer was used to form electrophotographic images to evaluate the images formed.

The images were reproduced in an environment of temperature 15° C. and relative humidity 10% RH. The images to be evaluated were halftone images on A4-size paper (images of lines of one-dot width which were drawn at two-dot intervals in the direction perpendicular to the rotational direction of the electrophotographic photosensitive member. The images reproduced were evaluated by visually observing the uniformity of halftone images at the time of one-sheet reproduction (initial stage) and that of halftone images reproduced after printing on 2,500 sheets at a print density of 1% (after running). From the images at the initial stage and after running, thus obtained, evaluation was made on any fine horizontal-line faulty images (horizontal lines attributable to charging) occurring because the charging member came to have a high resistance and on any vertical-line faulty images occurring because the surface of the charging member came stained with toner and so forth, which were evaluated according to the following criteria.

A: Any faulty image is not seen at all.
B: The above faulty images are very slightly seen.
C: The above faulty images are slightly seen.
D: The above faulty images are clearly seen.

Example 2

A material rubber was prepared in the same way as in Example 1 except that the conductive agent carbon black was compounded in an amount of 30 parts by mass based on 100 parts by mass of the binder polymer. Using the unvulcanized rubber obtained, a charging roller 2 was formed in the same way as in Example 1.

Example 3

A material rubber was prepared in the same way as in Example 1 except that the conductive agent carbon black was compounded in an amount of 70 parts by mass based on 100 parts by mass of the binder polymer. Using the unvulcanized rubber obtained, a charging roller 3 was formed in the same way as in Example 1.

Example 4

A material rubber was prepared in the same way as in Example 1 except that the binder polymer was changed for the synthesized Terminal-modified Copolymer Rubber 2. Using the unvulcanized rubber obtained, a charging roller 4 was formed in the same way as in Example 1.

Example 5

A material rubber was prepared in the same way as in Example 1 except that the conductive agent carbon black was compounded in an amount of 25 parts by mass based on 100 parts by mass of the binder polymer. Using the unvulcanized rubber obtained, a charging roller 5 was formed in the same way as in Example 1.

Example 6

A material rubber was prepared in the same way as in Example 1 except that the conductive agent carbon black was compounded in an amount of 75 parts by mass based on 100 parts by mass of the binder polymer. Using the unvulcanized rubber obtained, a charging roller 6 was formed in the same way as in Example 1.

Example 7

A material rubber was prepared in the same way as in Example 1 except that the carbon black as a conductive agent was changed for TOKA BLACK #5500 (trade name; available from Tokai Carbon Co., Ltd.; pH: 6; volatile component: 1.4 wt. %) and was compounded in an amount of 50 parts by mass based on 100 parts by mass of the binder polymer. Using the unvulcanized rubber obtained, a charging roller 7 was formed in the same way as in Example 1.

Example 8

A material rubber was prepared in the same way as in Example 1 except that the carbon black as a conductive agent was changed for TOKA BLACK #7400 (trade name; available from Tokai Carbon Co., Ltd.; pH: 7; volatile component: 1.5 wt. %) and was compounded in an amount of 50 parts by mass based on 100 parts by mass of the binder polymer. Using the unvulcanized rubber obtained, a charging roller 8 was formed in the same way as in Example 1.

Example 9

A material rubber was prepared in the same way as in Example 1 except that the carbon black as a conductive agent was changed for PRINTEX 300 (trade name; available from Evonik Degussa GmbH; pH: 9.5; volatile component: 0.6 wt. %) and was compounded in an amount of 50 parts by mass based on 100 parts by mass of the binder polymer. Using the unvulcanized rubber obtained, a charging roller 9 was formed in the same way as in Example 1.

Example 10

A material rubber was prepared in the same way as in Example 1 except that the carbon black as a conductive agent was changed for RAVEN 1255 (trade name; available from Columbian Carbon; pH: 2.5; volatile component: 2.7 wt. %) and was compounded in an amount of 50 parts by mass based on 100 parts by mass of the binder polymer. Using the unvulcanized rubber obtained, a charging roller 10 was formed in the same way as in Example 1.

Example 11

A material rubber was prepared in the same way as in Example 1 except that the binder polymer was changed for the synthesized Terminal-modified Copolymer Rubber 3. Using the unvulcanized rubber obtained, a charging roller 11 was formed in the same way as in Example 1.

Example 12

A material rubber was prepared in the same way as in Example 1 except that the binder polymer was changed for the synthesized Terminal-modified Copolymer Rubber 4. Using the unvulcanized rubber obtained, a charging roller 12 was formed in the same way as in Example 1.

Comparative Example 1

A material rubber was prepared in the same way as in Example 8 except that the binder polymer was changed for the synthesized Unmodified Copolymer Rubber 1 and that the carbon black as a conductive agent was compounded in an amount of 50 parts by mass based on 100 parts by mass of the binder polymer. Using the unvulcanized rubber obtained, a charging roller 13 was formed in the same way as in Example 1.

Comparative Example 2

A material rubber was prepared in the same way as in Example 8 except that the binder polymer was changed for the synthesized Unmodified Copolymer Rubber 2 and that the carbon black as a conductive agent was compounded in an amount of 45 parts by mass based on 100 parts by mass of the binder polymer. Using the unvulcanized rubber obtained, a charging roller 14 was formed in the same way as in Example 1.

How the compositions according to Examples 1 to 12 are composed is summarily shown in Table 2. The results of evaluation of the charging rollers according to Examples 1 to 12 are also shown in Table 3. How the compositions according to Comparative Examples 1 and 2 are composed and the results of evaluation of the charging rollers according to Comparative Examples 1 and 2 are still also shown in Tables 4 and 5, respectively.

TABLE 2

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Terminal-modified Copolymer Rubber: | | | | | | | | | | | | | | |
| 1 | | | 100 | 100 | 100 | — | 100 | 100 | 100 | 100 | 100 | 100 | — | — |
| 2 | | | — | — | — | 100 | — | — | — | — | — | — | — | — |
| 3 | | | — | — | — | — | — | — | — | — | — | — | 100 | — |
| 4 | | | — | — | — | — | — | — | — | — | — | — | — | 100 |
| Carbon black: | pH | Volatile comp. | | | | | | | | | | | | |
| TOKA BLACK #5500 | 6 | 1.4 | — | — | — | — | — | — | 50 | — | — | — | — | — |
| TOKA BLACK #7400 | 7 | 1.5 | — | — | — | — | — | — | — | 50 | — | — | — | — |
| REGAL 660 | 7.5 | 1.0 | 50 | 30 | 70 | 50 | 25 | 75 | — | — | — | — | 50 | 50 |

TABLE 2-continued

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| PRINTEX 300 | 9.5 | 0.6 | — | — | — | — | — | — | — | — | 50 | — | — | — |
| RAVEN 1255 | 2.5 | 2.7 | — | — | — | — | — | — | — | — | — | 50 | — | — |
| Zinc oxide | | | 5 | 5 | 5 | 5 | 5 | 5 | 5 | 5 | 5 | 5 | 5 | 5 |
| Zinc stearate | | | 1 | 1 | 1 | 1 | 1 | 1 | 1 | 1 | 1 | 1 | 1 | 1 |
| Sulfur | | | 1.2 | 1.2 | 1.2 | 1.2 | 1.2 | 1.2 | 1.2 | 1.2 | 1.2 | 1.2 | 1.2 | 1.2 |
| NOCCELLER TBzTD | | | 1 | 1 | 1 | 1 | 1 | 1 | 1 | 1 | 1 | 1 | 1 | 1 |
| SANTOCURE-TBSI | | | 1 | 1 | 1 | 1 | 1 | 1 | 1 | 1 | 1 | 1 | 1 | 1 |

TABLE 3

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| - Phys.-Property Evaluation - | | | | | | | | | | | | |
| MD-1 hardness (degrees) | 72 | 61 | 83 | 72 | 57 | 86 | 75 | 70 | 71 | 73 | 71 | 72 |
| Roller resistance: Initial stage ($\Omega$) | $7.5 \times 10^4$ | $2.1 \times 10^5$ | $1.9 \times 10^4$ | $7.7 \times 10^4$ | $2.4 \times 10^5$ | $1.1 \times 10^4$ | $1.2 \times 10^4$ | $4.4 \times 10^4$ | $1.1 \times 10^5$ | $4.1 \times 10^5$ | $4.2 \times 10^4$ | $4.6 \times 10^4$ |
| Peripheral non-uniformity of Roller resistance (Initial stage) (times) | 1.5 | 1.7 | 1.8 | 1.4 | 1.5 | 1.9 | 1.8 | 1.7 | 1.7 | 1.8 | 1.7 | 1.6 |
| Environmental dependence of Roller resistance (times) | 1.2 | 1.1 | 1.1 | 1.1 | 1.2 | 1.1 | 1.1 | 1.2 | 1.2 | 1.1 | 1.2 | 1.2 |
| Roller resistance of after electrification ($\Omega$) | $1.0 \times 10^5$ | $3.0 \times 10^5$ | $2.5 \times 10^4$ | $1.1 \times 10^5$ | $4.1 \times 10^5$ | $1.5 \times 10^4$ | $1.8 \times 10^4$ | $6.6 \times 10^4$ | $1.8 \times 10^5$ | $6.2 \times 10^5$ | $6.6 \times 10^4$ | $6.8 \times 10^4$ |
| Resistance retentivity (%) | 73 | 70 | 76 | 68 | 59 | 73 | 67 | 67 | 58 | 66 | 64 | 68 |
| - Image Evaluation - | | | | | | | | | | | | |
| Horizontal lines attributable to charging (Initial stage) | A | A | A | A | A | A | A | A | A | A | A | A |
| Horizontal lines attributable charging (After running) | A | A | A | B | B | A | A | A | B | B | B | B |
| Horizontal lines after running | A | A | A | A | A | B | A | A | B | B | B | A |

TABLE 4

| | | | Comparative Example | |
|---|---|---|---|---|
| | | | 1 | 2 |
| Unmodified Copolymer Rubber 1 | | | 100 | — |
| Unmodified Copolymer Rubber 2 | | | — | 100 |
| Carbon black: | pH | Volatile component | | |
| TOKA BLACK #7400 | 7 | 1.5 | 50 | 45 |
| Zinc oxide | | | 5 | 5 |
| Zinc stearate | | | 1 | 1 |
| Sulfur | | | 1.2 | 1.2 |
| NOCCELLER TBzTD | | | 1 | 1 |
| SANTOCURE-TBSI | | | 1 | 1 |

TABLE 5

| | Comparative Example | |
|---|---|---|
| | 1 | 2 |
| - Phys.-Property Evaluation - | | |
| MD-1 hardness (degrees) | 72 | 69 |
| Roller resistance: | | |
| Initial stage ($\Omega$) | $3.6 \times 10^4$ | $7.7 \times 10^4$ |
| Peripheral non-uniformity of Roller resistance (Initial stage) (times) | 2.1 | 2.2 |
| Environmental dependence of Roller resistance (times) | 1.2 | 1.2 |
| Roller resistance of after electrification ($\Omega$) | $1.2 \times 10^5$ | $3.0 \times 10^5$ |
| Resistance retentivity (%) | 30 | 26 |
| - Image Evaluation - | | |
| Horizontal lines attributable charging (Initial stage) | A | A |
| Horizontal lines attributable to charging (After running) | D | D |
| Horizontal lines after running | A | B |

As is clear from Tables 3 and 5, the charging rollers of Comparative Examples 1 and 2 are seen to have a low resistance retentivity and change greatly in electrical resistance with their long-term electrification. They are also seen to cause horizontal lines attributable to charging with their long-term service and, in forming high-grade electrophotographic images, be relatively inferior to the charging members of Examples. They are still also seen to show 2.0 or more times of peripheral non-uniformity in electrical resistance and, as to the dispersibility of carbon black in the elastic layer as well, be relatively inferior to the dispersibility of carbon black in the elastic layers of the charging rollers according to Examples.

The charging rollers of Examples 1 to 12 are within the scope of the present invention, where their peripheral non-uniformity in electrical resistance is 1.9 times or less, their resistance retentivity is 50% or more, and their ranks of the image evaluation are not lower than B in all the items, thus good images having no problem in practical use have been obtained.

This application claims priority from Japanese Patent Application No. 2009-290917, filed on Dec. 22, 2009, which is herein incorporated by reference as part of this application.

What is claimed is:

1. A charging member comprising:
a conductive support; and
an elastic layer,
wherein said elastic layer comprises a vulcanized rubber, and
wherein said vulcanized rubber is a vulcanized product of a composition comprising:
  i) a binder which comprises a polymer having a butadiene skeleton, said polymer being represented by the following formula (1) or (2):

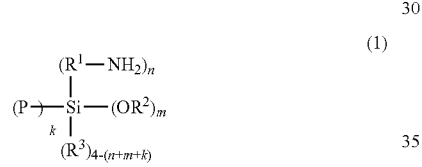

(1)

wherein P represents a chain of said polymer having a butadiene skeleton, $R^1$ is an alkylene group having 1 to 12 carbon atom(s), $R^2$ and $R^3$ are each independently an alkyl group having 1 to 20 carbon atom(s), n is an integer of 1 or 2, m is an integer of 1 or 2, and k is an integer of 1 or 2, provided that the value of n+m+k is an integer of 3 or 4; or

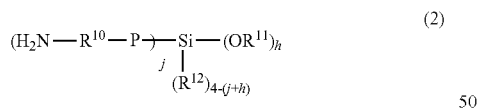

(2)

wherein P represents a chain of said polymer having a butadiene skeleton, $R^{10}$ is an alkylene group having 1 to 12 carbon atom(s), $R^{11}$ and $R^{12}$ are each independently an alkyl group having 1 to 20 carbon atom(s), j is an integer of 1 to 3, and h is an integer of 1 to 3, provided that the value of j+h is an integer of 2 to 4; and (ii) conductive carbon black having been dispersed in said binder,
wherein the carbon black has pH in the range of from 3 to 9.

2. A charging member comprising:
a conductive support; and
an elastic layer,
wherein said elastic layer comprises a vulcanized rubber, and
wherein said vulcanized rubber is a vulcanized product of a composition comprising:
  i) a binder which comprises a polymer having a butadiene skeleton, said polymer being represented by the following formula (1) or (2):

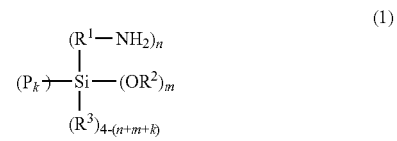

(1)

wherein P represents a chain of said polymer having a butadiene skeleton, $R^1$ is an alkylene group having 1 to 12 carbon atom(s), $R^2$ and $R^3$ are each independently an alkyl group having 1 to 20 carbon atom(s), n is an integer of 1 or 2, m is an integer of 1 or 2, and k is an integer of 1 or 2, provided that the value of n+m+k is an integer of 3 or 4; or

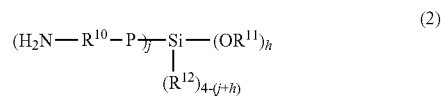

(2)

wherein P represents a chain of said polymer having a butadiene skeleton, $R^{10}$ is an alkylene group having 1 to 12 carbon atom(s), $R^{11}$ and $R^{12}$ are each independently an alkyl group having 1 to 20 carbon atom(s), j is an integer of 1 to 3, and h is an integer of 1 to 3, provided that the value of j+h is an integer of 2 to 4; and (ii) conductive carbon black having been dispersed in said binder,
wherein the carbon black has the volatile component in the range of from 0.3 wt % to 5.0 wt %.

3. A charging member comprising:
a conductive support; and
an elastic layer,
wherein said elastic layer comprises a vulcanized rubber, and
wherein said vulcanized rubber is a vulcanized product of a composition comprising:
  i) a binder which comprises a polymer having a butadiene skeleton, said polymer being represented by the following formula (1) or (2):

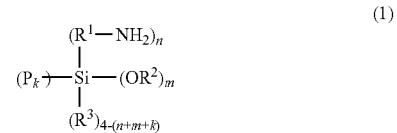

(1)

wherein P represents a chain of said polymer having a butadiene skeleton, $R^1$ is an alkylene group having 1 to 12 carbon atom(s), $R^2$ and $R^3$ are each independently an alkyl group having 1 to 20 carbon atom(s), n is an integer of 1 or 2, m is an integer of 1 or 2, and k is an integer of 1 or 2, provided that the value of n+m+k is an integer of 3 or 4; or

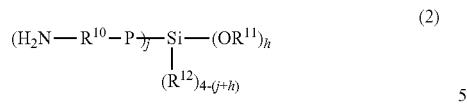

(2)

wherein P represents a chain of said polymer having a butadiene skeleton, $R^{10}$ is an alkylene group having 1 to 12 carbon atom(s), $R^{11}$ and $R^{12}$ are each independently an alkyl group having 1 to 20 carbon atom(s), j is an integer of 1 to 3, and h is an integer of 1 to 3, provided that the value of j+h is an integer of 2 to 4; and (ii) conductive carbon black having been dispersed in said binder, wherein the carbon black is compounded in the composition in an amount of from 30 parts by mass to 70 parts by mass based on 100 parts by mass of the polymer having a butadiene skeleton.

* * * * *